United States Patent [19]

Sheehan

[11] Patent Number: 5,993,905
[45] Date of Patent: Nov. 30, 1999

[54] LOW-TEMPERATURE DENSIFICATION OF CARBON FIBER PREFORMS BY COLLOIDAL GRAPHITE IMPREGNATION AND MECHANICAL CONSOLIDATION

[75] Inventor: James E. Sheehan, deceased, late of Solana Beach, Calif., by Jane Sheehan, heiress

[73] Assignee: MSNW, Inc., San Marcos, Calif.

[21] Appl. No.: 08/786,392

[22] Filed: Oct. 29, 1996

Related U.S. Application Data

[60] Provisional application No. 60/008,112, Oct. 30, 1995.

[51] Int. Cl.⁶ .................................................. B05D 3/00
[52] U.S. Cl. ......................... 427/294; 427/296; 427/375; 427/384
[58] Field of Search .................................... 427/294, 296, 427/375, 384

[56] References Cited

U.S. PATENT DOCUMENTS

| | | | |
|---|---|---|---|
| 3,174,895 | 3/1965 | Gibson et al. | 161/259 |
| 3,233,014 | 2/1966 | Bickerdike et al. | 264/29 |
| 3,238,054 | 3/1966 | Bickerdike et al. | 117/46 |
| 3,462,289 | 8/1969 | Rohl et al. | 117/46 |
| 5,304,330 | 4/1994 | Tatarchuk et al. | 264/61 |
| 5,468,358 | 11/1995 | Ohkawa et al. | 204/181.5 |

OTHER PUBLICATIONS

G.M. Pajonk and J. Maire, "Preparation and Densification of Carbon/Carbon Composites by the Aerogel Method. Very Fine–Grain Carbons Obtained by CVD." Extended Abstract of the International Carbon Conference, Bordeau, France, Jul. 1984.

*Primary Examiner*—Benjamin Utech
*Assistant Examiner*—Lynette T. Umez-Eronini
*Attorney, Agent, or Firm*—Frost & Jacobs LLP

[57] ABSTRACT

An improved method for producing low-cost carbon—carbon composites based on impregnating carbon fiber mat preforms with liquid dispersions or suspensions of fine carbon particles and subsequent mechanical consolidation is disclosed. A highly porous preform of carbon fibers is impregnated by a liquid suspension of colloidal graphite and dried in air at low temperatures. Multiple impregnation and drying densification cycles provide a soft, flexible carbon—carbon composite. Subsequent mechanical consolidation methods, such as pressing or rolling, combined with rigidization by resin or pitch impregnation and carbonization, render a thin carbon—carbon composite of high bulk density. Prior to rigidization, the composite may be sewn with carbon yarns for property enhancement.

7 Claims, No Drawings

LOW-TEMPERATURE DENSIFICATION OF CARBON FIBER PREFORMS BY COLLOIDAL GRAPHITE IMPREGNATION AND MECHANICAL CONSOLIDATION

This is a non-provisional application based upon an earlier-filed provisional application, Ser. No. 60/008,112 filed Oct. 30, 1995.

BACKGROUND OF THE INVENTION

The present invention relates generally to composite materials containing fibers and a carbon matrix, and more particularly to a process for fabricating thin carbon-fiber carbon-matrix composites of high density.

Carbon fiber-carbon matrix (C—C) composites are a class of lightweight, very high-temperature materials that have a variety of niche applications in the aircraft and aerospace industries. Among these applications, use in the fabrication of rocket nozzles, reentry nosetips and heat shields, and aircraft brake disks are some of the most important.

C—C composites are fabricated in general by a two-step method in which a carbon fiber preform is first assembled by a variety of textile processes that either directly yield useful shapes or produce bulk materials that are subsequently shaped. Second, the carbon matrix is formed by depositing the matrix into the preform by either repeated cycles of liquid impregnation and pyrolysis, or continuous processing by simultaneous gas infiltration and pyrolysis. During the liquid infiltration method, fluid carbonaceous resins or pitches are soaked into the porous fiber preform and then are pyrolyzed, or thermally decomposed, to form carbon. In contrast, the gas infiltration method utilizes a flowing hydrocarbon gas that is allowed to diffuse into the fiber preform under conditions in which the gas slowly decomposes to form carbon.

Several references are illustrative of this basic processing technology. For instance, U.S. Pat. No. 3,174,895, Gibson, et al., discloses a method of fabricating artificial carbon or graphite bonded cloth laminates that have flexibility, strength, and electrical property advantages over monolithic artificial graphites. Graphite cloth sheets are painted with a carbonaceous binder, stacked, molded, cured together under pressure and baked to form the laminates. U.S. Pat. Nos. 3,233,014 and 3,238,054, Bickerdike, et al., disclose a method for fabricating fibrous carbon articles by pyrolytic deposition in which a fibrous preform is heated in a stream of gas containing a gaseous carbon compound so that carbon is decomposed from the gas to deposit within the preform to form the matrix; alternatively, the carbon matrix can be formed by a process in which a synthetic carbon-yielding resin, such as a furfuryl alcohol, impregnates the preform and the resin is subsequently polymerized and carbonized. U.S. Pat. No. 3,462,289, Rohl and Robinson, teaches a method of producing high density reinforced carbon and graphite bodies whereby a carbon or graphite fiber preform is made into a shape and pressure impregnated in vacuum by a suitable carbonaceous resin, followed by pressure curing and baking. The entire impregnation and baking cycle must be repeated in order to properly densify the part. The number of cycles is determined by the density that is desired in the finished shape. It is believed that these patents define the current state-of-the-art in C—C composite processing technology.

An important and fundamental drawback with these processing methods serves to increase the cost and complexity of C—C composites to the point that C—C composites can only be used in highly specialized applications. Because C—C composites begin to oxidize at temperatures as low as 425° C., all current processing methods require prolonged and/or repeated processing at high temperatures in the absence of oxygen. Although many modifications have been made in the past decades to streamline the C—C composite fabrication process, none of these modifications represent more than incremental improvements to these basic methodologies.

SUMMARY OF THE INVENTION

The present invention was completed to overcome the above-mentioned drawback. Accordingly, it is an object of the present invention to significantly reduce the cost and complexity of fabricating C—C composites.

It is another object of the present invention to reduce the duration and number of high-temperature processing cycles necessary to fabricate C—C composites.

It is another object of the present invention to provide a method for densifying carbon fiber mat preforms by impregnation with colloidal liquid dispersions or other appropriate liquid dispersions or suspensions of fine carbon particles.

It is yet another object of the present invention to provide a method for enhancing the density and other properties of C—C composites fabricated by colloidal graphite liquid infiltration by permanently reducing the thickness of the C—C composites via mechanical consolidation.

It is still further another object of the present invention to provide a method for enhancing the density and other properties of C—C composites fabricated by colloidal graphite liquid infiltration by permanently reducing the thickness of the C—C composites via sewing single or multiple preforms together with continuous carbon yarns followed by mechanical pressing.

It is still further another object of the present invention to provide a method for rigidizing C—C composites fabricated by colloidal graphite liquid infiltration by utilizing resin or pitch impregnation and pyrolysis.

To achieve the foregoing and other objects, and in accordance with the purposes of the present invention as described herein, an improved process for producing low-cost, high density C—C composites by colloidal graphite impregnation followed by mechanical consolidation is provided. This process includes impregnating a porous fiber preform with finely-divided carbon dispersed in a liquid vehicle and then evaporating the liquid at a low temperature, which produces carbon in the preform without the need for prolonged or repeated high-temperature processing cycles in the absence of oxygen. Additional property enhancement can be achieved by pressing individual fiber preforms or by sewing preforms with continuous carbon yarns followed by subsequent pressing so as to decrease the porosity, increase the fiber and matrix content, and thereby enhance the density and other properties of the resulting C—C composite.

Still other objects of the present invention will become apparent to those skilled in this art from the following description wherein there is described a preferred embodiment of this invention. As will be realized, the invention is capable of other different embodiments, and its several details are capable of modification in various, obvious aspects all without departing from the invention. Accordingly, the descriptions will be regarded as illustrative in nature and not as restrictive.

DETAILED DESCRIPTION OF THE INVENTION

Reference will now be made in detail to the preferred embodiment of the present invention. As will be clearly illustrated by the examples which follow, the method of the invention stated in simple terms comprises the following steps: first, a very porous preform mat containing a low volume percentage of carbon fiber is impregnated by a liquid containing colloidal graphite or other appropriate liquid dispersions or suspensions of fine carbon particles which are known in the art. This procedure can be accomplished, among others, by vacuum or drain impregnation methods. Second, the surfaces of the impregnated mat are wiped to remove excess liquid. Third, the mat is dried in air to evaporate the liquid. These three steps comprise a single processing cycle. The resulting carbon matrix is noncoherent and particulate in nature. As a result, the densified carbon fiber mat that is produced by repeated cycles is a soft, flexible, and compressible C—C composite.

The fiber preforms which are used in the present invention are made from carbon fibers, are highly porous and have a low fiber volume. They are formed by methods known in the art such as, for example, air-laying, braiding, or weaving. The mats typically have a thickness of from about 0.5 mm to about 10 mm, a fiber thickness of from about 1 $\mu$m to about 15 $\mu$m and a fiber length of from about 1 mm to about 100 mm.

The fiber preforms are treated with colloidal or other appropriate liquid dispersions or suspensions of fine carbon particles. The solvents used in forming these dispersions or suspensions should be relatively volatile so that they may be removed by air drying without having to resort to high temperatures. Typical drying temperatures are non-oxidizing temperatures for carbon, such as from about 100° C. to about 400° C. Further, the solvents should be chosen so that they suspend the carbon particles. Examples of suitable solvents include acetone, ethyl alcohol, isopropyl alcohol, benzene, or mineral spirits. Mineral spirits (petroleum distillates) is a particularly preferred solvent. It is preferred that the suspensions be colloidal in nature, containing from about 5% to about 50%, preferably about 10%, by weight solids. The particles generally have a particle size of from about 0.01 $\mu$m to about 5 $\mu$m, preferably from about 0.1 $\mu$m to about 1.0 $\mu$m. Any carbon particulate material may be used in forming the suspensions used in the process of the present inventions. Examples of such materials include carbon black, channel black, or milled natural flake graphite, with graphite being particularly preferred. In addition, adjunct particulate materials, such as graphite flour, may be included in the suspension to modify the properties of the final product.

The soft and compressible C—C produced by colloidal graphite impregnation of the carbon fiber mat presents the opportunity for increasing the fiber content and bulk density by mechanical consolidation methods such as pressing or rolling. The mats can be pressed with or without first sewing them together with carbon yarns, and the sewing can be done either before or after densification by colloidal graphite impregnation. Sewing the easily-pierced mat with carbon yarns presents a convenient method for improving the properties of the resulting C—C composite. Sewing appears to be possible after mechanical consolidation of the fiber mats as well. The mats can be sewn together in layers or side by side to modify the size and/or the shape of the mats. The final uncompressed composites typically have a bulk density of from about 0.2 g/cm$^3$ to about 1.0 g/cm$^3$ and contain from about 2 vol. % to about 20 vol. % fiber and from about 10 vol. % to about 50 vol. % matrix. The compressed composites typically have a bulk density of from about 1.0 g/cm$^3$ to about 2.0 g/cm$^3$ and contain from about 5 vol. % to about 50 vol. % fiber and from about 20 vol. % to about 80 vol. % matrix.

Finally, the yarns and densified mat may be rigidized and further densified to the preferred degree by the use of conventional resin or pitch impregnation and carbonization after sewing and/or pressing. Examples of resins or pitches which may be used for that purpose include furfuryl alcohol, furfural-resorcinol, coal tar pitch, or petroleum pitch.

IMPREGNATION EXPERIMENTS

To demonstrate the preferred processing methodology for obtaining high-quality C—C composites by the process of the present invention, several experiments were conducted. The concept of depositing carbon at low temperatures inside a porous carbon fiber preform by repeated dispersed-particle impregnation and drying cycles was demonstrated by using a commercial carbon (graphite) colloidal suspension (commercially available as any of several varieties of DAG™ from Acheson Colloids Co.) and a commercial preform material comprised of short, random carbon fibers interlaced as a thin mat or paper (commercially available as LYDALL 300™ from Lydall, Inc.). This mat was 1.7 mm in thickness and contained approximately 4 vol. % carbon fibers of 7 $\mu$m diameter and whose lengths varied between 3 mm and 6 mm. The colloidal suspension was a fluid composed of 10 wt. % (7 vol. %) fine graphite particles dispersed in mineral spirits, such as petroleum distillate. The graphite particles were 0.1 to 1.0 $\mu$m in diameter.

Two different procedures were used to impregnate layers of the carbon fiber mat. In the first procedure, cut sections of the mat were placed in a vessel that was sealed and evacuated to about 5 mm Hg pressure. The colloidal graphite suspension was then introduced into the mat by pulling the liquid suspension into the vessel using the vacuum. Once the mat was covered with liquid, the pressure was returned to ambient by letting air flow into the vessel. The second procedure was to fit a cut section of the mat into a filter cup containing holes in its bottom, and pouring the colloidal graphite liquid through the mat. The mat was turned over for each subsequent drain cycle.

After impregnation by either procedure, the surfaces of the mat were wiped to remove excess liquid and the mat was dried in air at 200° C. for 0.5 hours in an oven. A single processing cycle included impregnation, wiping the mat surfaces and oven drying.

Table 1 compares experimentally-determined cumulative weight increases versus number of cycles for the vacuum and drain impregnation procedures with theoretical maximum weight increases. The theoretical maximum weight increases were calculated on the basis of the specific gravity of the colloidal graphite liquid, the weight percent graphite in the liquid, and the percent porosity of the carbon fiber mat. As can be seen, the vacuum impregnation procedure is about 70% efficient in filling the available pores of the mat with graphite after 10 impregnation cycles.

Small amounts of residual organic material contained in the colloid were periodically removed at 400° C. to obtain a true indication of carbon yield. Microscopic inspection of surfaces exposed by cutting through the densified mat revealed that vacuum impregnation produced a uniform deposition of carbon particulate through the mat thickness. Ten cycles of vacuum impregnation and drying increased the bulk density of the carbon fiber mat from 0.06 g/cm$^3$ to about 0.5 g/cm$^3$. This constitutes a C—C composite having about 4 vol. % fibers and about 20 vol. % matrix.

TABLE 1

Theoretical Versus Experimental Cumulative Percent Weight Increase for Vacuum and Drain Colloidal Graphite Impregnation Methods and 200° C. Drying of Carbon Fiber Mat.

| Impregnation Cycle | Theoretical Maximum Weight Increase (%) | Vacuum Impregnation Weight Increase (%) | Drain Impregnation Weight Increase (%) |
| --- | --- | --- | --- |
| 1 | 134 | 111 | 217 |
| 2 | 259 | 200 | 349 |
| 3 | 375 | 289 | 455 |
| 4 | 483 | 389 | 540 |
| 5 | 585 | 478 | 622, 523*† |
| 6 | 679 | 544, 457* | |
| 7 | 767 | 600 | |
| 8 | 849 | 678 | |
| 9 | 925 | 767 | |
| 10 | 996 | 833, 700* | |

*400° C. heating in argon
†Impregnation process halted

The data listed in Table 1 for the drain impregnation procedure indicate this process yielded greater than the calculated theoretical maximum increase for the corresponding impregnation cycle. This is an indicator that the mat was being coated to a significant degree during the drain cycles, as well as being impregnated. Table 1 shows that drain impregnation was stopped after five cycles. At this point, it was evident that the mat was no longer permeable due to the coating, and that the colloidal graphite liquid was draining around the edges rather than through the mat. Microscopic inspection of cut sections of fiber mat impregnated by the drain impregnation process revealed high concentrations of graphite at the mat surfaces with less graphite inside the mat.

Based on the results of the impregnation experiments heretofore described, it was confirmed that vacuum impregnation yields a more uniform C—C composite than drain impregnation. Regardless of the impregnation procedure, the carbon matrix produced by colloidal processing is noncoherent and particulate in nature. As a result, the densified carbon fiber mat is a soft, flexible and compressible C—C composite. Material in this condition has been rigidized by a single cycle of conventional C—C liquid densification processing. This involves impregnation by liquid resin or pitch and then heating the mat to temperatures of 800° C. or higher in an inert environment to carbonize the resin or pitch. The coherent carbon formed by the high-temperature resin or pitch pyrolysis binds the fibers and carbon particulate together to form a hard and relatively inflexible C—C composite.

MECHANICAL CONSOLIDATION EXPERIMENTS

The soft and compressible C—C produced by colloidal graphite impregnation of the carbon fiber mat presents the opportunity for increasing the fiber content and bulk density by mechanical consolidation methods such as pressing or rolling. Several pressing experiments were performed in which the thicknesses of single and double layers of colloidal graphite-impregnated carbon fiber mat were permanently reduced by pressing. In one case, a single layer of C—C mat was compressed between steel platens under about 83 MPa pressure. The thickness decreased from about 1.7 mm to about 0.7 mm, increasing the bulk density from about 0.6 g/cm$^3$ to about 1.4 g/cm$^3$. This represents an increase of fiber content from about 4 vol. % to about 9 vol. %, and an increase of carbon matrix content from about 24 vol. % to about 57 vol. %. The porosity correspondingly decreased from about 72 vol. % to about 20 vol. %.

In a similar experiment, two layers of C—C mat were sewn together and pressed from a thickness of about 3.3 mm to about 0.9 mm. Here, the bulk density increased from about 0.5 g/cm$^3$ to about 1.6 g/cm$^3$, with an increase of fiber content from about 4 vol. % to about 14 vol. % and an increase of carbon matrix content from about 19 vol. % to about 67 vol. %. The porosity decreased from about 77 vol. % to about 14 vol. %. After pressing, the C—C mats possessed substantially increased rigidity and hardness.

Thus, in accordance with the invention, there has been provided an improved method for fabricating C—C composites by a low-temperature colloidal graphite impregnation and mechanical consolidation process. In the described preferred embodiment, this process consists of impregnating highly porous, low fiber volume preforms by vacuum or drain impregnation using liquid colloidal suspensions of graphite. The impregnated mat is then wiped clean and dried in an oven before another cycle of colloidal graphite impregnation is undertaken. Multiple cycles produce a soft, flexible, densified C—C composite that can be further enhanced and densified by mechanical consolidation and sewing with continuous carbon yarns.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated.

What is claimed is:

1. A method of fabricating a carbon—carbon composite which comprises
    (a) impregnating a plurality of carbonaceous fiber preforms with a solution containing colloidal carbon;
    (b) drying said plurality of impregnated carbonaceous fiber preforms;
    (c) sewing together said plurality of impregnated carbonaceous fiber preforms; and
    (d) mechanically consolidating said plurality of impregnated preforms.

2. A method of fabricating a carbon—carbon composite according to claim 1 wherein said impregnation of a carbonaceous fiber preform is accomplished by vacuum.

3. A method of fabricating a carbon—carbon composite according to claim 1 wherein said impregnation of a carbonaceous fiber preform is accomplished by drain impregnation.

4. A method of fabricating a carbon—carbon composite according to claim 1 wherein said drying is accomplished in air.

5. A method of fabricating a carbon—carbon composite according to claim 1 wherein said drying is accomplished in air at nonoxidizing temperatures.

6. A method of fabricating a carbon—carbon composite according to claim 1 wherein said mechanical consolidation is accomplished by pressing.

7. A method of fabricating a carbon—carbon composite according to claim 1 wherein said mechanical consolidation is accomplished by rolling.

* * * * *

UNITED STATES PATENT AND TRADEMARK OFFICE
CERTIFICATE OF CORRECTION

PATENT NO. : 5,993,905
DATED : November 30, 1999
INVENTOR(S) : James E. Sheehan

It is certified that error appears in the above-indentified patent and that said Letters Patent is hereby corrected as shown below:

Column 6, line 39, (claim 1) please insert the word --mechanically-- directly before the word "impregnating".

Signed and Sealed this

Twenty-fifth Day of July, 2000

Attest:

Q. TODD DICKINSON

Attesting Officer

Director of Patents and Trademarks